W. H. FORD.
APPARATUS FOR MAKING CAST ARTICLES.
APPLICATION FILED MAR. 19, 1910.
1,119,418.
Patented Dec. 1, 1914.
2 SHEETS—SHEET 2.
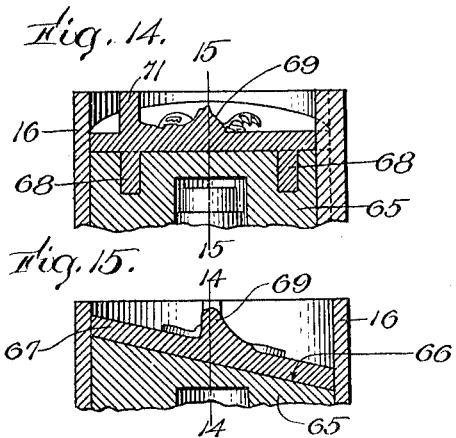
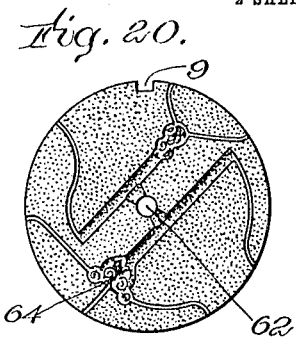
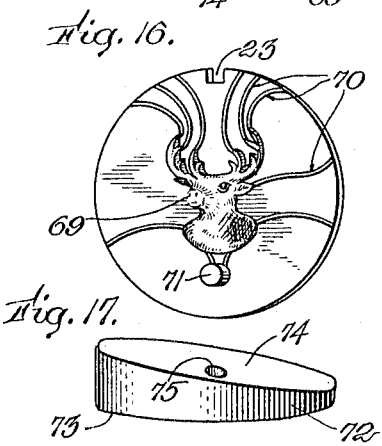
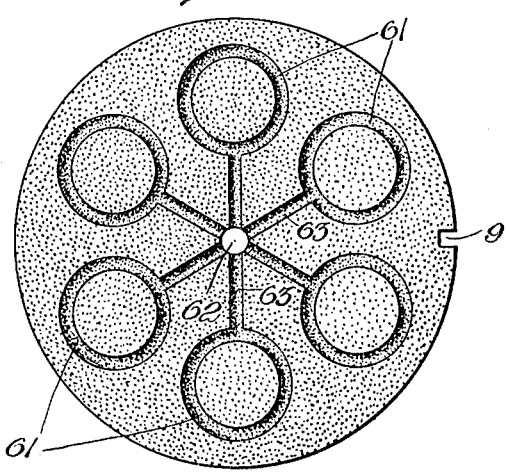
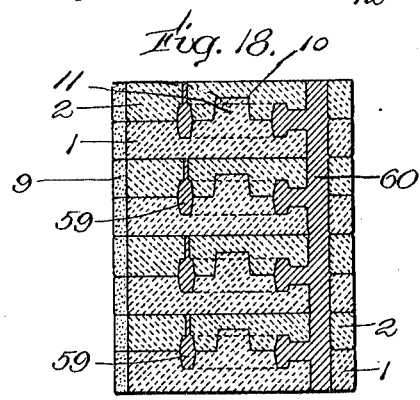
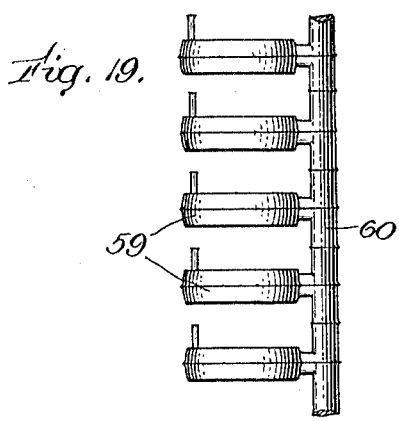
Witnesses:
Wm. J. Pike
Edward Maxwell
Inventor:
William H. Ford,
by Geo. H. Maxwell,
Attorney.
THE NORRIS PETERS CO., PHOTO-LITHO., WASHINGTON, D. C.

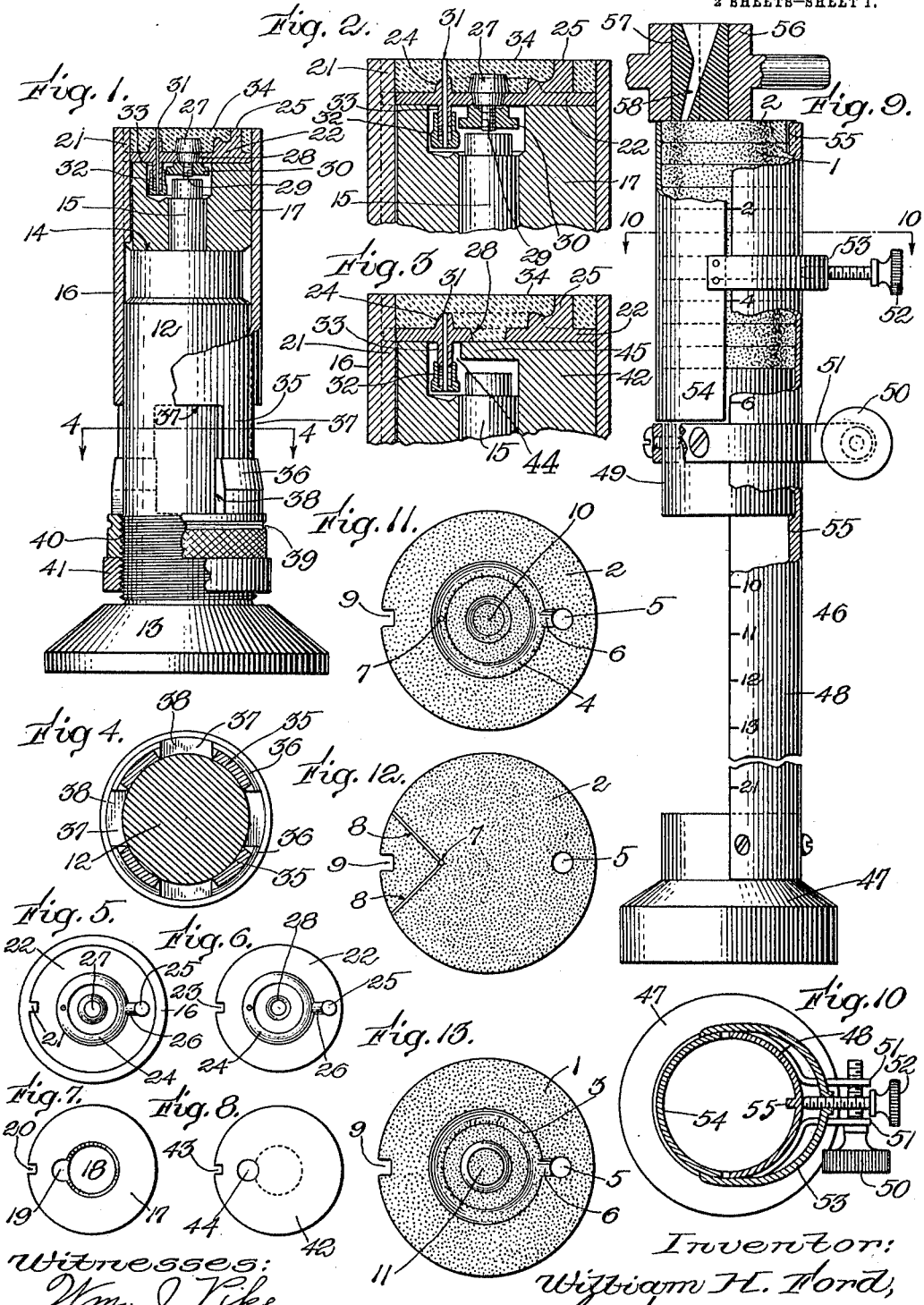
W. H. FORD.
APPARATUS FOR MAKING CAST ARTICLES.
APPLICATION FILED MAR. 19, 1910.
1,119,418. Patented Dec. 1, 1914.
2 SHEETS—SHEET 1.

UNITED STATES PATENT OFFICE.

WILLIAM H. FORD, OF LOWELL, MASSACHUSETTS, ASSIGNOR OF ONE-HALF TO FRANK HANCHETT, OF LOWELL, MASSACHUSETTS.

APPARATUS FOR MAKING CAST ARTICLES.

1,119,418.      Specification of Letters Patent.      Patented Dec. 1, 1914.

Application filed March 19, 1910. Serial No. 550,425.

*To all whom it may concern:*

Be it known that I, WILLIAM H. FORD, a citizen of the United States, and resident of Lowell, in the county of Middlesex and State of Massachusetts, have invented an Improvement in Apparatus for Making Cast Articles, of which the following description, in connection with the accompanying drawings, is a specification, like letters on the drawings representing like parts.

My invention is an apparatus for forming cast articles from molten metal, either circular or flat, and includes means for stacking a plurality of individual molds in such manner that a series of articles, either alike or different, can be cast in said series of molds, all at one pouring.

The constructional details and various advantages of my invention will be pointed out more at length in the course of the following description, taken in connection with the accompanying drawings, in which I have shown a preferred embodiment of the invention.

In the drawings, Figure 1 is a view partly in side elevation, broken away, and mainly in vertical section, showing a portion of the mold shaping and forming mechanism; Fig. 2 is an enlarged vertical sectional view of the upper portion of said mechanism; Fig. 3 is a similar enlarged sectional view of the mechanism shown in Fig. 2 when used for making the complemental portion of the mold to coöperate with the portion shown as being made in Fig. 2; Fig. 4 is a horizontal sectional view on the line 4—4, Fig. 1; Fig. 5 is a top plan view of the upper end of the molding apparatus; Figs. 6, 7, and 8 are top plan views showing respectively the mold pattern, and the two receiving blocks for supporting said mold pattern; Fig. 9 is a view partly in side elevation broken away, and partly in section, of the holder and pouring apparatus, showing a series of individual molds stacked in position to be poured together; Fig. 10 is a horizontal sectional view on the line 10—10, Fig. 9; Figs. 11 and 12 are top and bottom views of one half of the mold, and Fig. 13 is a plan view of the other half of the mold; Fig. 14 is a central vertical sectional view of the upper end of the molding apparatus provided with means for molding a pattern which cannot be drawn perpendicularly because of undercut parts, said section being taken on the line 14—14, Fig. 15; Fig. 15 is a sectional view thereof taken on the line 15—15, Fig. 14; Fig. 16 is a top plan view of the mold pattern employed in the oblique arrangement of Figs. 14 and 15; Fig. 17 is a slightly perspective view in side elevation of the cope or covering used with the molded portion of the pattern made by the mechanism of Figs. 14–16; Fig. 18 is a vertical sectional view through several of the individual molds shown in the series piled up in Fig. 9, said figure exhibiting the metal in said molds after it has been poured; Fig. 19 is a view in side elevation of the casting produced by my apparatus, after the molds have been broken away therefrom; and Figs. 20 and 21 are plan views of molds showing flat molding, said views being present in order to show the adaptability of my invention to a wide range of casting, either flat or circular.

For the purpose of carrying out many of the features of my invention, I prefer to make the molds circular, although it will be understood that this is merely a preferred form as relates to other features.

Referring to Figs. 11–13, and 18, where one form of the mold is shown, it will be seen that each mold is composed of two blocks or pieces 1, 2 of molded sand or other suitable material, shown herein as circular in peripheral outline and containing the complemental portions 3, 4 of the shape which is to receive the metal for making the required cast article, whatever the said article may be, a plain ring being herein shown for convenience of illustration. At one side I provide a vertical hole or gate 5 for receiving the molten metal, and a feed gate 6 connecting therefrom to the mold cavity 3 or 4 as the case may be. A vent hole 7 is provided in the top member 2, leading to one or more lateral vent passages 8 on the outer side of the mold for permitting the gases to escape from each mold cavity independently of the rest when the metal is entering the same. At some peripheral point of the mold, herein shown as opposite the gate 5, I provide a suitable alining device or means, herein shown as a notch 9, and at the center of each mold I provide centering means coöperating with said alining means for insuring that the two portions 3 and 4 of the mold cavity shall invariably be brought into absolutely correct alinement automatically simply by putting the parts together in the only way in which they can be put together. Said centering means, as herein shown in the preferred embodiment of my invention, consists of a conical depression 10 formed in the center of the upper part 2 and the conical projection 11 formed at the center of the other part 1, said projection or male part 11 fitting accurately the depression or female part 10 when the parts are assembled as shown in Fig. 18. Referring now to the means for making this mold, Figs. 1–8, I provide a column 12 extending upwardly from a base 13 and having a flat shoulder 14 near its top about a central post 15 extending therefrom. Surrounding this post is a shell or tubular frame 16 which normally forms a box or receptacle for the rest of the molding mechanism for the molding sand or other material. In this tube I place a removable receiving block 17 having a central opening 18, Fig. 7, corresponding to the size of the post 15 for positioning the block 17, and an offset recess 19 to receive a part to be presently described. At some point in its periphery, I provide one portion of an alining means, herein shown as a notch 20, to fit against a rib or vertical projection 21 on the inside of the tube 16. Thus when the block 17 is dropped into the tube on the post 15 of the column 12, it will always come in the same position and also will rotate with the tube when desired, as will presently be explained. The pattern 22 to coöperate with the parts thus far described is provided with a similar notch 23 to fit the rib or projection 21 in order that it may be accurately alined with the block 17 and also may rotate with the tube or frame 16 when desired. This pattern consists of a horizontal plate, preferably of metal, having on its upper side in relief the portion 24 of the pattern which is to provide the required metal-receiving recess in the mold, the same, as herein shown, consisting of one half of the ring which is to be cast. At one side this pattern 22 is provided with a tubular post 25 and branch connection 26 for forming respectively the hole 5 and branch 6 in the parts 1 and 2 of the mold. At its center, the pattern plate is provided with a conical projection 27 removably mounted in a preferably conical seat or hole 28 formed in the pattern plate, said part 27 having at its under side a threaded stem 29 to receive a clamping nut 30 by means of which it is clamped in place whenever the mold is to receive the female part or depression 10. A slender rod 31 is mounted in the pattern at a suitable place to form the vent hole 7 of the mold when required, and in order that this vent hole may be formed only in one part, preferably the part 2 of the mold, I provide means for the partial withdrawal of this rod or pin 31, herein shown as a threaded cap or sleeve 32 having threaded engagement with a depending stud 33 of the pattern. When the part 2 of the mold is to be formed, the block 17 and the pattern 22 are put in place as shown in Fig. 1, and the sand or other mold making material is driven hard into the opening or exposed top of the frame 16 and then shaved off flush therewith as indicated at 34, Figs. 1 and 2. To remove or eject the mold piece thus made, I provide, as a convenient way of accomplishing this result, means for permitting this surrounding frame or tube 16 to be forcibly slid downward on the column 12, said means being herein shown as comprising projections 35 extending from column 12 and coöperating with projections 36 on nut 39, and openings 37, 38, the projections 35, 36 serving to hold the tube up during the mold making operation and then simply by rotating the tubular frame 16 a short distance, the projection 35 drops into the notch 38 and the projection 36 into a notch 37, there being preferably a series of these notches and projections around the periphery of the coöperating parts. Preferably instead of having the projections and notches 36, 38 stationary with the base 13, I provide them on an adjustable nut 39 preferably having threaded engagement with the column at 40, a lock nut 41 serving to lock the nut 39 accurately at whatever height it is adjusted. This provision enables me to make the molds of any thickness desired as may be required according to any given work which it is desired to mold and then cast. Having made the part 2 of the mold as described, and stripped or ejected the same from the apparatus, in order to make the part 1 of the mold, I remove the block 17 and pattern 22 while the tube is still down, and put in place a block 42, and on top of it the pattern, slightly changed. This block has an alining notch 43 corresponding to the notch 20 of the other block, and a depression 44 in its top side to receive the depending portion of the vent-making member 31 of the pattern, and an opening in its under side to fit over the post 15 of the column, but has a smooth top surface otherwise, including a central closed head 45. Having put this block 42 in place, I remove the projection 27 from the pattern by unscrewing the nut 30 therefrom, and also draw down the vent pin 31, so that it cannot project thereafter into the sand, and then place this revised pattern on top of the block 42, the parts then being as shown in Fig. 3. Thereupon the tubular frame 16 is raised, its projection or rib 21 engaging the notches 43 and 23, and then the sand or other mold-making material is packed into place as before, the result being that the part 1 of the mold is thus made.

The above process is repeated until the desired number of individual molds are made, whereupon said molds are stacked in a holder 46, Figs. 9, 10. This holder comprises a base 47 to which is secured a preferably semi-circular shell-like upright 48 on which is mounted a clamping rest 49 held in desired vertical adjustment by a thumb screw 50 engaging clamping ears 51. The rest 49 may consist of a cylindrical block as shown, which may be gripped in different positions of vertical adjustment by the clamping device shown, so as to leave the desired space thereabove for the molds. Tightening means, herein shown as a thumb screw 52 operating in a yoke 53 against the shell upright 48 serves to tighten a clamp or holding plate 54 against the included molds so that they cannot possibly shift their position. Preferably along one edge of the upright 48, I provide a series of numbers to set the mold rest with reference to, so that thereby the number of molds which may be stacked above a given point may be readily known. Having adjusted the rest 49 to a given number, a corresponding number of complete molds are stacked one upon another and placed on the rest 49 against the upright 48. Thereupon the clamping member 54 is slid down over the top of the column of molds, and the latter are held down by the finger or hand hard against the rest 49 while the clamp is tightened by turning the thumb nut 52 until the clamping member 54 is tightened firmly against the molds so that they cannot move. The upright 48 is provided on its inner side with a rib or projection 55 corresponding exactly to the rib or projection 21, so that when the molds are put in place therein, their notches 9 are necessarily brought into accurate alinement with each other because of their engagement with this projection or rib 55, and inasmuch as the coöperating male and female parts 10 and 11 of each mold center the individual parts of each mold and the semi-circular form of the upright 48 and of the clamping member 54 brings all the molds into vertical alinement above each other, it follows that the gate openings 5 of all the molds are in accurate vertical alinement throughout the entire series. A receiving cup 56 provided preferably with a charcoal or other suitable heat-resisting lining 57 having a receiving pouring opening 58 is then placed in proper position on top of the alined molds, and the metal is poured. The result is that it flows down into each and all of the molds, filling at the bottom first and thence upward in the successive molds toward the top until they are all full, the gases escaping from each individual mold independently of all the rest and yet all the molds being poured at one time. The resulting casting is shown in Fig. 19, where it will be seen that all the rings 59 are connected by an integral sprue 60.

Instead of forming merely one ring in each mold, it will be understood that practically any kind of a pattern may be made according to my invention, Fig. 21 showing a mold provided with cavities for making a series of rings 61, all leading to a central pouring opening 62 by branch feeds 63. In Fig. 20 I have also shown a central pouring opening 62, but an entirely different kind of a figure 64 molded into the mold of the kind known as a flat pattern. Some patterns have inclined projections, so that they cannot be drawn by a movement perpendicular to the general plane of the pattern, and accordingly in Figs. 14–17, I have shown the modification of my previously described construction which is necessary in order to make a mold which will draw from undercut parts. A block 65 is provided which corresponds in general function to the blocks 17 and 42, this block having its top surface 66 oblique to the vertical direction of the inclosing frame or tube 16. A pattern plate 67 is properly shaped to rest on this surface 66, having depending portions 68 to enter recesses provided therefor in the block 65 so as to bring it always into correct position. The pattern herein shown is an elk's head 69, and inasmuch as this has a number of points, it is necessary to mold into the mold a large number of vent or hot-air or gas escapes 70. This pattern is provided with a projection 71 for forming the gate or metal-receiving hole in the mold. The remaining steps in making the mold are the same as already described, Coöperating with the part of the mold thus formed is simply a plain block, cope or cover 72 having one side 73 flat and the other side 74 oblique but flat or plane so as to receive the oblique under surface of the part of the mold which carries the elk's-head impression, a hole 75 being formed through this block 72 to coöperate with the metal pouring hole in the other part of the mold so that a number of molds containing such an undercut portion may all be poured at one time the same as previously described.

From the foregoing description, it will readily be understood that my invention is capable of a wide range of embodiments, and that by its use practically any kind of a pattern can be cast, and yet a series of molds all poured at one time, and applied to any line of casting.

Having described my invention, what I claim as new, and desire to secure by Letters Patent is:

1. Molding apparatus, comprising a supporting column, a pattern holder removably mounted on said column provided with means for molding a gate through each mold made thereby, a removable frame inclosing said column and pattern and projecting above the latter to receive the mold material, said apparatus containing means for forming in said mold a means of alinement for bringing a series of molds into position with their gates alined for being poured together.

2. Molding apparatus, comprising a supporting column, a pattern holder removably mounted on said column provided with means for molding a gate through each mold made thereby, a removable frame inclosing said column and pattern and projecting above the latter to receive the mold material, said frame having on its inner side a vertical inwardly extending projection.

3. Molding apparatus, comprising a cylindrical supporting column, a pattern holder removably mounted thereon, a tubular frame surrounding said column and holder, said frame having a vertical rib to engage said holder, and coöperating means normally holding the frame in raised position and permitting the holder to lower for ejecting the mold when made.

In testimony whereof, I have signed my name to this specification, in the presence of two subscribing witnesses.

WILLIAM H. FORD.

Witnesses:
M. J. SPALDING,
EDWARD MAXWELL.

Copies of this patent may be obtained for five cents each, by addressing the "Commissioner of Patents, Washington, D. C."